2 Sheets—Sheet 1.
H. GREEN.
Mower.
No. 562.
Reissued May 25, 1858.
Fig: 1.
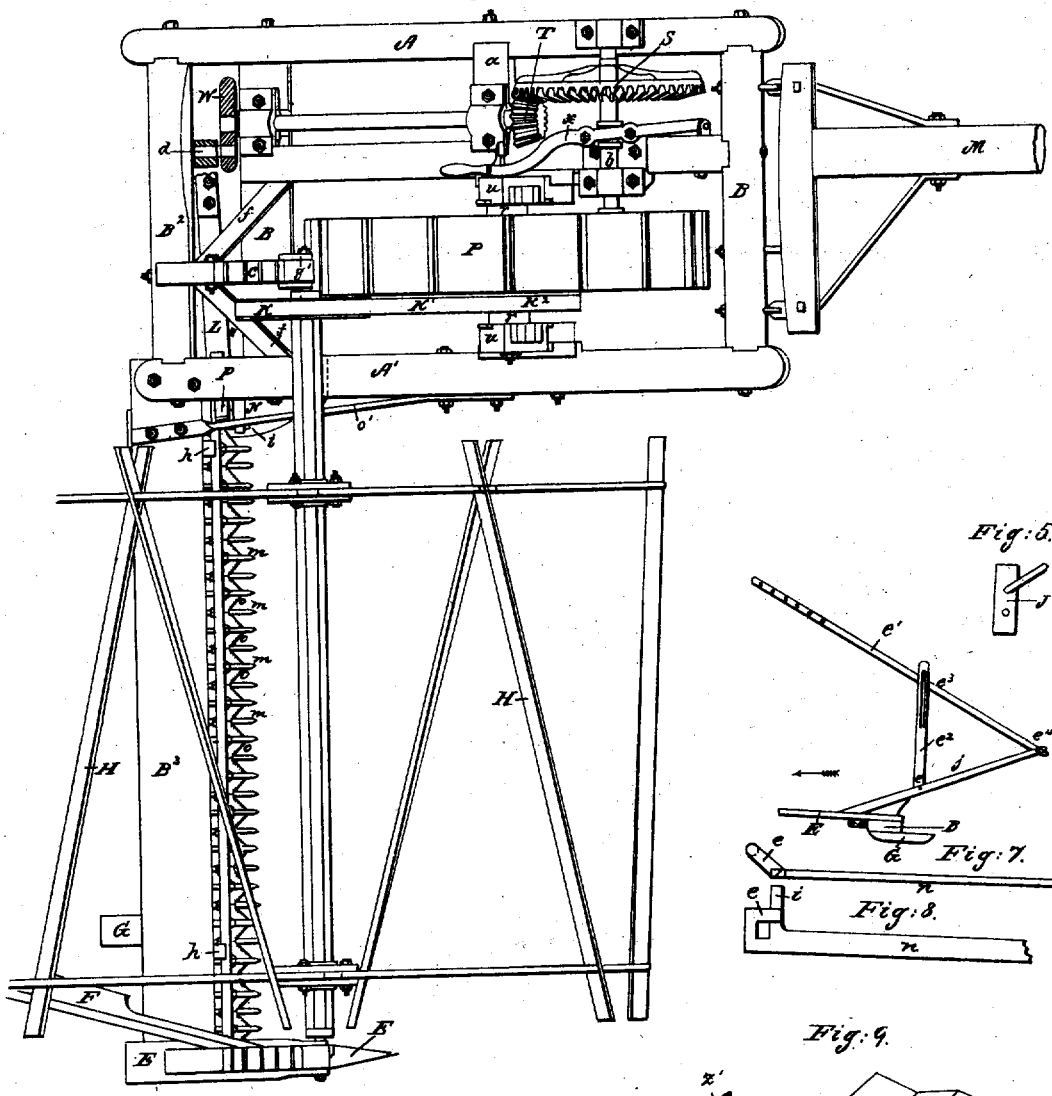
Fig: 5.
Fig: 7.
Fig: 8.
Fig: 9.
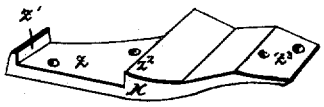
N. PETERS. Photo-Lithographer. Washington, D. C.

2 Sheets—Sheet 2.
H. GREEN.
Mower.
Reissued May 25, 1858.
No. 562.
Fig: 2.
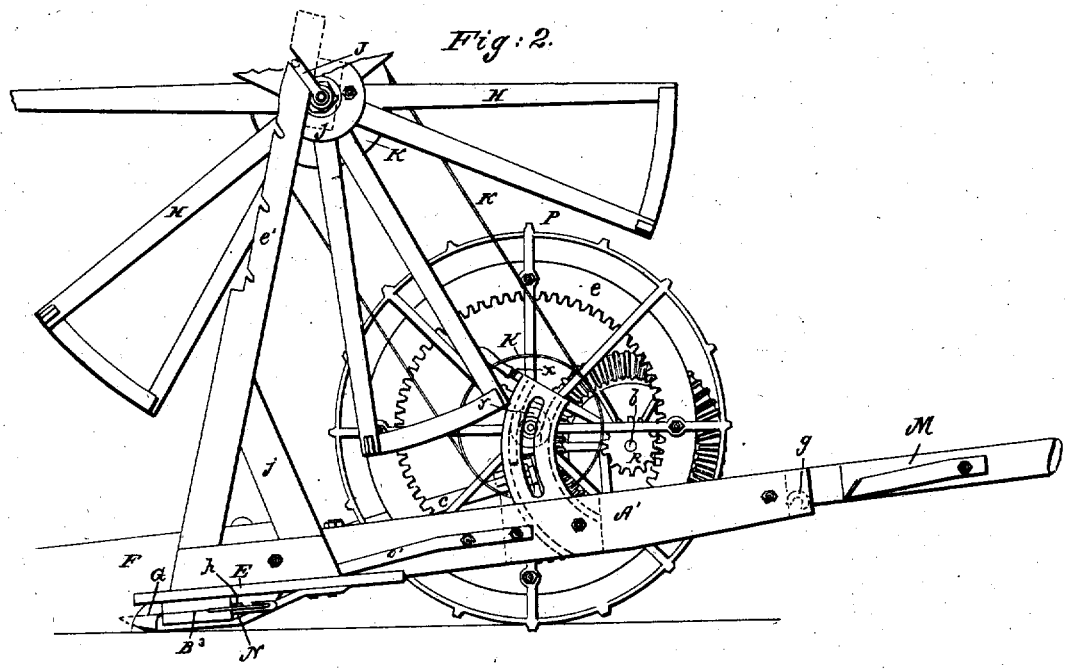
Fig: 3.
Fig: 4.
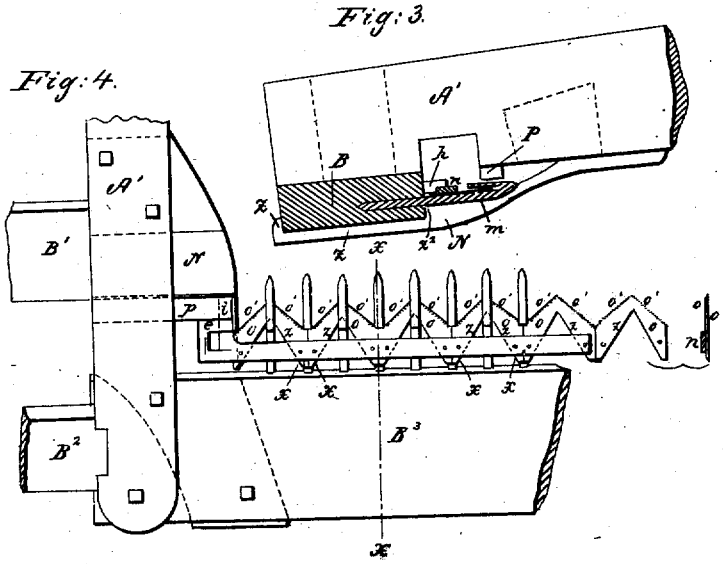
N. PETERS, Photo-Lithographer, Washington, D. C.

UNITED STATES PATENT OFFICE.

HENRY GREEN, OF OTTAWA, ILLINOIS.

IMPROVEMENT IN MOWING-MACHINES.

Specification forming part of Letters Patent No. 10,657, dated March 21, 1854; antedated September 21, 1853; Reissue No. 562, dated May 25, 1858.

DIVISION No. 2.

*To all whom it may concern:*

Be it known that I, HENRY GREEN, of Ottawa, in the county of La Salle and State of Illinois, have invented certain new and useful Improvements in Harvesting-Machines, of which the following is a full, clear, and exact description, reference being had to the accompanying drawings, which make part of this specification, and in which—

Figure 1 represents a plan of a harvesting-machine (as arranged for mowing grass) which embraces my improvements. Fig. 2 represents an elevation of the machine as seen when looking at it toward that end which runs next the standing grain or grass. Fig. 3 represents a section through the finger-beam at the line *x x* of Fig. 4, and an elevation of the shoe and of the adjacent parts of the frame, showing principally the manner in which the finger-beam is connected by means of the shoe to the frame. Fig. 4 represents a plan of the parts shown in Fig. 3. Fig. 5 represents a box, J, for the journal of the reel-shaft, and a stirrup, J′, for suspending this box to the reel-post. Fig. 6 represents an arrangement of inclined arms which is deemed preferable in most cases to the post shown in Figs. 1 and 2 for supporting the axle of the reel over the divider. Fig. 7 represents an elevation of the back, and Fig. 8 a plan of that end of the bar *n* of the sickle and which is shown in Fig. 4; Fig 9 represents a view in perspective of the shoe for connecting the finger-beam and gear-fame.

Of the above-mentioned figures, Figs. 1, 2, and 5 are made according to the scale of feet represented on the drawings; Figs. 3, 4, 7, and 8 upon a larger and Fig. 6 upon a smaller scale, and Fig. 9 upon a scale different from that of any of the rest of the figures.

In mowing-machines made prior to my invention there have always been difficulties in causing the cutting apparatus to run sufficiently close to the ground for harvesting to the best advantage those grasses and grains the stalks of which it is desirable to save for fodder. These difficulties I have remedied by arranging the bar or finger-beam which supports the cutting apparatus at some distance in the rear of the axis of the driving-wheel and hinging the tongue by which the machine is drawn to the frame in front of that axis. By means of such combination the finger-beam can be permitted to rest on the ground and slide along on proper shoes or their equivalents, while the driving-wheel can rise and fall without lifting it from this position. Moreover, any tipping of the frame on the axle of the driving-wheel by any differences of level in the surfaces of the ground that the wheel and finger-beam respectively rest upon will not tend, as in other machines, to force the fingers or any part of the cutting apparatus into the earth. The bar or beam thus arranged in connection with such a frame and tongue may always be kept close to the ground either by arranging the machine so that the greatest weight lies in rear of the driving-wheel or by hooking the evener or its equivalent to the frame of the machine below a line drawn from the horse's shoulders to the axle of the driving-wheel, in consequence of which the pull of the team will tend to depress the rear of the frame, and consequently the cutting apparatus, or both these contrivances may be used together. Such a relative arrangement of driving-wheel and cutting apparatus, in combination with a hinged tongue or pole and proper appliances for keeping the cutting apparatus in close proximity to the ground, substantially as described, constitutes one branch of my invention.

The rear end of the main frame which supports the gearing and is carried by the driving-wheel, would, if lower than the cutting apparatus or on the same level therewith, run on the stubble, pushing the cut grass before it until a wad or bunch was collected, which would roll up and increase in size, augmenting the draft of the machine, impeding its progress, and often tilting it so as to lift the cutting apparatus, and thereby make a balk in the cutting. To remedy this difficulty is the object of the second branch of my invention, which consists in arranging and combining the finger-beam with the main frame of the gearing in such manner that the portion of the finger-beam to which the fingers are secured will extend below the level of the said main frame to permit the cutting apparatus to run close to the ground while the gearing frame is carried above it to avoid trailing upon the stubble.

In the construction of mowing-machines embracing the second branch of my invention it is important that provision should be made for supporting, in part at least, the weight of the end of the finger-beam and cutting apparatus next the gearing-frame and that of the rear of the gearing-frame, especially when the frame, by tilting backward, presses heavily upon the beam; and it is also necessary that the finger-beam should be attached to the gearing-frame in a solid and substantial manner. These conditions are especially important in my machine, in which that part of the finger-beam to which the cutting apparatus is secured is on a lower level than the rear end of the gearing-frame, in which position the finger-beam is more liable to be wrenched off. To support the finger-beam and strengthen its connection with the gearing-frame, I have connected it and the gearing-frame by means of a metallic shoe, which also serves as a runner to slide on the ground and carry the finger-beam, thereby rendering the friction and draft much less than they would be if the finger-beam itself were permitted to slide upon the ground unsupported in this manner; and this method of connecting the finger-beam and gearing-frame constitutes the third branch of my invention.

To enable others skilled in the art to make and use my improvements, I will proceed to describe the construction of a machine for mowing which embraces them, referring to the drawings aforesaid.

I construct a frame in the form represented in Figs. 1 and 2, with two side rails, A A′, connected together by three cross-bars, B B′ B², with a center rail, A², fastened to the cross-bars B B′, and with a short cross-bar, *a*, between the rails A and A². This frame should be firmly fastened by bolts or otherwise.

I fasten to the rails A′ A² two metal segments, *u u*, to sustain the boxes *v v* of the driving-wheel P. These segments are constructed, as represented, with curved slots in them concentric with the pinion R, so that in whatever part of the slots the boxes *v v* may be placed they will always support the axis of the driving-wheel at the same distance from the axis of the pinion R. The boxes *v v* are constructed to slide in the slots of the segments *u u*, and may be fastened therein in any required position by bolts or otherwise, as may be most convenient.

The driving-wheel P is fastened to a shaft whose journals are fitted to and run in the bearings of the boxes *v v*, so that by changing the position of the boxes in the segments the frame before described may be raised or lowered to the desired distance from the ground, as by this arrangement it is suspended by means of the boxes *v v* on the axle of the wheel P. A gear-wheel, Q, is fastened to the arms of the wheel P and turns a pinion, R, upon a shaft, *b*, which shaft turns in boxes fastened to the rails A and A², and carries a bevel-wheel, S, which drives a bevel-pinion, T, on a shaft, *c*. The latter turns in boxes fastened to the cross-bars *a* and B′, and it carries on its rear end a disk, W, having a stud or wrist-pin, *d*, which disk and stud, being turned by the shaft *c*, form the crank which traverses a sickle connected to it by a link-rod, L, as represented. It is obvious that the preponderance of the weight of the machine is behind the axis of the driving-wheel, and that the machine will tend to tilt backward.

The finger-beam or supporter of the cutting apparatus B³ is fastened to the rail A′ of the frame of the gearing in the proper position by a bracket and shoe, N, which I prefer to make of the shape represented in the drawings—namely, with its rear portion, *z*, flat to form a seat for the under side of the finger-beam, and having a flange, *z′*, across it at the rear, and a rib, *z²*, also across it at the front of the seat *z* for the finger-beam, to hold the finger-beam more firmly in place, the front portion of the shoe rising upward in a gentle curve to bring it from the level of the under side of the finger-beam to the under side of the beam A′ of the gear-frame, where another portion of it, *z³*, which extends still farther forward, is made flat, that it may be more firmly secured to the frame. The curve by which it rises from the finger-beam to the frame gives it a suitable form for either a runner or a bracket, and thus adapts it to perform the office of both. The front portion of this shoe is immediately beneath the side beam, A′, of the frame; but it is wider than this beam and projects on the side next the cutting apparatus, and the rear end of the plate is turned laterally toward the cutters far enough to carry it entirely from beneath the frame, that it may extend a sufficient distance onto the finger-beam to act as a lateral brace between that and the beam A′, thereby increasing the rigidity and security of the connection of the finger-beam and gearing-frame. This shoe and the finger-beam are connected together and secured to the frame by means of screw-bolts, and in the present machine the strength of the connection is increased by the employment of a brace, O′. By this connection it is clear that the cutting apparatus and its support are carried below the level of the rear end of the gearing-frame, and that the latter will clear the stubble even when the former is running in close proximity to the ground. This shoe is made of iron, and I prefer to make it of cast-iron.

This machine is to be provided with proper cutting apparatus, and, if desired, with a reel, and I prefer to use such a cutter as is shown in Figs. 3 and 4 and such a reel-support as is shown in Fig. 6 of the drawings; but as neither the precise kind of reel, reel-support, or cutting apparatus has any bearing upon the invention claimed in this patent, and as such invention is independent of them and applicable to other machines employing various kinds of reels, reel-supports, and vibrating cutters, and of equal importance when no reel is used, I deem it unnecessary to describe them at length in this patent.

The tongue M, to which the horses are harnessed, is made in the usual form, and is hinged to the frame, as represented. The double-tree or evener, by which the horses draw, may be fastened to a hook, *g*, in the cross-bar B, which hook *g* should be placed in the lower part of this bar, that by means of the draft of the horses the fore end of the frame may be raised and the rear end, with the cutting-teeth and fingers, depressed. A shoe or runner, G, is fastened to the finger-beam to carry its outer end.

What I claim under this patent is—

1. A cutting apparatus behind the driving-wheel of a machine adapted to mowing, when this is combined with a tongue or pole hinged substantially as described, and with proper means, substantially such as described, for causing the cutting apparatus to run in close proximity with the ground, the whole combination being substantially such as and for the purposes set forth.

2. Arranging and combining the finger-beam with the rear end of the main frame of the gearing in such manner that while the portion of the finger-beam to which the cutting apparatus is secured extends below the frame and may run close to the ground the rear end of the frame will be carried above the stubble, and this relative position of the rear end of the frame of the finger-beam and of the ground will not be disturbed by the rising and falling of the finger-beam or of the driving-wheel to follow inequalities in the surface of the ground in their respective paths.

3. The combination and arrangement of a metallic shoe substantially such as herein described, the finger-beam, and gearing-frame, substantially as herein set forth.

In testimony whereof I have hereunto subscribed my name.

HENRY GREEN.

In presence of—
P. H. WATSON,
HENRY BALDWIN, Jr.